United States Patent
Jin et al.

(10) Patent No.: US 12,381,290 B2
(45) Date of Patent: Aug. 5, 2025

(54) BATTERY CELL, MANUFACTURING METHOD AND MANUFACTURING APPARATUS OF SAME, BATTERY, AND ELECTRIC APPARATUS

(71) Applicant: CONTEMPORARY AMPEREX TECHNOLOGY (HONG KONG) LIMITED, Hong Kong (CN)

(72) Inventors: Zelin Jin, Fujian (CN); Wei Chen, Fujian (CN); Tong Pei, Fujian (CN); Dongyang Shi, Fujian (CN); Chuan Li, Fujian (CN)

(73) Assignee: CONTEMPORARY AMPEREX TECHNOLOGY (HONG KONG) LIMITED, Hong Kong (CN)

( * ) Notice: Subject to any disclaimer, the term of this patent is extended or adjusted under 35 U.S.C. 154(b) by 108 days.

(21) Appl. No.: 18/372,137

(22) Filed: Sep. 25, 2023

(65) Prior Publication Data
US 2024/0030562 A1 Jan. 25, 2024

Related U.S. Application Data

(63) Continuation of application No. PCT/CN2021/123964, filed on Oct. 15, 2021.

(51) Int. Cl.
*H01M 50/533* (2021.01)
*H01M 10/04* (2006.01)
(Continued)

(52) U.S. Cl.
CPC ....... *H01M 50/533* (2021.01); *H01M 10/049* (2013.01); *H01M 50/103* (2021.01);
(Continued)

(58) Field of Classification Search
CPC . H10M 50/533; H01M 50/548; H01M 50/209
See application file for complete search history.

(56) References Cited

U.S. PATENT DOCUMENTS

| 9,660,245 B2 * | 5/2017 | Kong | H01M 50/186 |
| 10,651,498 B2 * | 5/2020 | Li | H01M 50/553 |
| 2021/0119258 A1 | 4/2021 | Zou et al. | |

FOREIGN PATENT DOCUMENTS

| CN | 203103421 U | * | 7/2013 |
| CN | 104157824 A | | 11/2014 |

(Continued)

OTHER PUBLICATIONS

Extended European Search Report issued Dec. 2, 2024 in European Patent Application No. 21960262.0.
(Continued)

*Primary Examiner* — Maria Laios
*Assistant Examiner* — Jordan E Berresford
(74) *Attorney, Agent, or Firm* — XSENSUS LLP

(57) ABSTRACT

A battery cell may include: a housing, provided with a first opening at one end along a first direction; a first end cover, configured to seal the first opening, where the first end cover includes an end cover body and a first electrode terminal provided on the end cover body; an electrode assembly, provided inside the housing, where the electrode assembly may include a main body and a first tab led out from the main body; and a first adapter, including a first portion, a second portion, and a third portion, where the first portion may be located on a side, from which the first tab may be led out, of the main body and electrically connected to the first tab, and the second portion may be located on a side of the main body close to the first end cover and connected to the first portion.

14 Claims, 8 Drawing Sheets

(51) Int. Cl.
  *H01M 50/103* (2021.01)
  *H01M 50/15* (2021.01)
  *H01M 50/209* (2021.01)
  *H01M 50/526* (2021.01)
  *H01M 50/548* (2021.01)

(52) U.S. Cl.
  CPC ......... *H01M 50/15* (2021.01); *H01M 50/209* (2021.01); *H01M 50/526* (2021.01); *H01M 50/548* (2021.01); *H01M 2220/20* (2013.01)

(56) References Cited

FOREIGN PATENT DOCUMENTS

| | | |
|---|---|---|
| CN | 205452420 U | 8/2016 |
| CN | 208923266 U | 5/2019 |
| CN | 210136949 U | 3/2020 |
| EP | 3451416 A1 | 3/2019 |
| JP | 2003-217557 A | 7/2003 |
| JP | 2013-077496 A | 4/2013 |
| JP | 2016-143618 A | 8/2016 |
| JP | 2019-515470 A | 6/2019 |
| JP | 2021-176122 A | 11/2021 |
| KR | 10-2010-0045356 A | 5/2010 |
| KR | 10-2011-0058658 A | 6/2011 |
| WO | 2020/071516 A1 | 4/2020 |

OTHER PUBLICATIONS

Office Action issued Jul. 30, 2024 in Japanese Patent Application No. 2023-540600 with machine English translation thereof.
International Search Report and Written Opinion mailed on Jul. 11, 2022, received for PCT Application PCT/CN2021/123964, filed on Oct. 15, 2021, 16 pages including English Translation.
Office Action issued May 15, 2025 in Korean Patent Application No. 10-2023-7022003 with English translation thereof.

* cited by examiner

BATTERY CELL, MANUFACTURING METHOD AND MANUFACTURING APPARATUS OF SAME, BATTERY, AND ELECTRIC APPARATUS

CROSS-REFERENCE TO RELATED APPLICATION

The present application is a continuation of International Application No. PCT/CN2021/123964, filed Oct. 15, 2021, which is incorporated herein by reference in its entirety.

TECHNICAL FIELD

This application relates to the field of battery technologies, and in particular, to a battery cell, a manufacturing method and a manufacturing apparatus of the same, a battery, and an electric apparatus.

BACKGROUND

Batteries such as lithium-ion batteries have been widely used in electric vehicles due to advantages such as high energy density, high power density, long cycle life and long storage time.

However, optimization of an assembly process of batteries in the electric vehicles remains a challenge in the industry.

SUMMARY

This application aims to improve an assembly process of a battery.

According to a first aspect of this application, a battery cell is provided and includes:
- a housing, provided with a first opening at one end along a first direction;
- a first end cover, configured to seal the first opening, where the first end cover includes an end cover body and a first electrode terminal provided on the end cover body;
- an electrode assembly, provided inside the housing, where the electrode assembly includes a main body and a first tab led out from the main body; and
- a first adapting member or adapter, including a first portion, a second portion, and a third portion, where the first portion is located on a side, from which the first tab is led out, of the main body and is electrically connected to the first tab, the second portion is located on a side of the main body close to the first end cover and is connected to the first portion, a first end of the third portion along a second direction is connected to a side end of the second portion along the second direction, and at least part of the third portion is located between the second portion and the end cover body and is electrically connected to the first electrode terminal, where the second direction is perpendicular to the first direction.

For the first adapting member in this embodiment, the second portion is extended to form the third portion, so that an included angle is formed between the third portion and the second portion when the third portion is electrically connected to the first electrode terminal; and an operation space connecting the third portion and the first electrode terminal is formed in a zone where the included angle is located, which can improve convenience of assembly and improve reliability of an electrical connection. After the third portion is electrically connected to the first electrode terminal, the third portion and the first end cover are bent along directly around a rotation axis toward the second portion, so that the first end cover seals the first opening. Therefore, with such structure, the electrical connection between the third portion and the first electrode terminal and the assembly of the first end cover can be skillfully implemented.

In addition, the electrode assembly is first placed into the housing and then the first end cover is installed, which also easily ensures accuracy of matching between the first end cover and the first opening, avoids larger force between the first end cover and the housing and larger force between the electrode assembly and the housing, and optimizes assembly performance, thereby improving performance and operating reliability of the battery cell.

In addition, if a second opening is provided at another end of the battery cell along the first direction and the second opening is sealed with the second end cover, the first end cover may be installed last during assembly, to resolve the problem that the electrical connection between the third portion and the first electrode terminal and the assembly of the first end cover cannot be implemented simultaneously. Therefore, such assembly manner may be applied to battery cells with different structures, not requiring special matching between the structures of the battery cells and assembly processes, featuring great versatility.

In some embodiments, the second direction is consistent with a thickness direction of the electrode assembly.

In this embodiment, when the third portion and the first end cover are bent along around a rotation axis toward the second portion, the first end cover may be rotated based on a longer edge of the first end cover to seal the first opening, which can reduce a rotation radius of the first end cover, reduce misalignment and shaking in a rotation process, and fit the first end cover into the first opening accurately, thereby ensuring uniformity of all circumferential gaps between the first end cover and the first opening and improving welding effects of the first end cover and the housing.

In some embodiments, a first tab is led out from a side end of the main body along a third direction, and the third direction is perpendicular to the first direction and the second direction.

In this embodiment, the first tab is provided on a side surface of the main body close to the first end cover, so that an independent operation space is present when the first tab and the first electrode terminal are electrically connected to the first adapting member, thereby facilitating assembly and ensuring reliability of the electrical connection. In addition, the first portion and the second portion are on two close side surfaces of the main body and form an L-shaped structure; and the third portion and the second portion form an included angle before assembly, for example, the third portion and the second portion are perpendicular to each other. The third portion is located at a side end of the second portion along the second direction, which can improve overall rigidity of the first adapting member. In this way, the second portion is not easily deformed during placement, transfer, or assembly of parts.

In some embodiments, the electrode assembly further includes a second tab led out from the main body, and the first tab and the second tab have opposite polarities and are led out from the same side end of the main body.

In this embodiment, an occupied space of the battery cell in the third direction can be reduced, and the energy density of the battery cell is increased.

In some embodiments, a second end of the third portion along the second direction is a free end, and the third portion is configured to bend, along with the first end cover connected to the third portion, toward the second portion, so that the first end cover seals the first opening.

In this embodiment, the electrical connection between the third portion and the first electrode terminal and the assembly of the first end cover can be implemented by using an assembly method for bending the third portion. During assembly, the electrode assembly may be first placed into the housing and then the first end cover is installed, which easily ensures accuracy of matching between the first end cover and the first opening and facilitates welding of the first end cover and the first opening, thereby optimizing assembly performance. In addition, for a battery cell with end covers provided at both ends, the first end cover may be installed last during assembly, to resolve the problem that the electrical connection between the third portion and the first electrode terminal and the assembly of the first end cover cannot be implemented simultaneously. In this way, such assembly process is highly versatile for battery cells with different structures.

In some embodiments, the first portion, the second portion, and the third portion are all plate-shaped structures, the first portion and the second portion are provided perpendicularly, and the second portion and the third portion are provided in parallel.

In this embodiment, the first portion and the second portion are provided perpendicularly, and after the first portion is electrically connected to the first tab, the second portion may be provided parallel to a side surface, facing the first end cover, of the main body, to reduce space occupied by the second portion in the first direction. In addition, after the third portion is bent until the first end cover seals the first opening, the second portion and the third portion are provided in parallel or, for example, can come into contact with each other or maintain a small gap, which can further reduce the space occupied by the second portion in the first direction.

In some embodiments, a position, connected to the third portion, of the second portion is retracted by a preset distance relative to an outer edge of the second portion along the second direction.

In this embodiment, a root position of the third portion is retracted by a preset distance relative to an outer edge of the second portion, which can prevent the third portion from exceeding the outer edge of the second portion along the second direction and coming into contact with the housing after being bent, thereby ensuring a gap between the electrode assembly and the housing after assembly and a gap between the first end cover and the housing.

In some embodiments, a weak zone is provided at a joint between the third portion and the second portion.

In this embodiment, the weak zone is provided at the joint between the third portion and the second portion, and after the third portion is electrically connected to the first electrode terminal, the third portion and the first end cover are jointly bent toward the second portion easily, which can avoid applying extra force to a joint between the first portion and the first tab and affecting connection effects, and can also prevent large bending force from deforming the first adapting member during bending. In this way, a bending position of the third portion relative to the second portion is accurate, and higher positioning accuracy after the first end cover seals the first opening makes circumferential gaps between the first end cover and the first opening uniform, thereby improving welding effects.

In some embodiments, the weak zone includes at least one of a thickness-reduced portion and a through groove extending along the third direction, and the third direction is perpendicular to the first direction and the second direction.

In some embodiments, the first adapting member is formed by stacking a plurality of layer structures.

In this embodiment, because each layer structure is relatively thin, the first adapting member formed by stacking the plurality of layer structures can reduce rigidity of the joint between the second portion and the third portion, so that the third portion is easier to bend.

In some embodiments, a second opening is provided at another end of the housing along the first direction, the electrode assembly further includes a second tab led out from the main body, and the battery cell further includes:
  a second end cover configured to seal the second opening, where the second end cover includes an end cover body and a second electrode terminal provided on the end cover body; and
  a second adapting member or adapter, including a first portion and a second portion, where the first portion is located on a side, from which the second tab is led out, of the main body and is electrically connected to the second tab, the second portion is located on a side of the main body close to the second end cover and is connected to the first portion, and the second portion is electrically connected to the second electrode terminal.

In this embodiment, when the battery cell has both the first end cover and the second end cover, the second electrode terminal may be first electrically connected to the second portion of the second adapting member, then respective first portions of the first adapting member and the second adapting member are electrically connected to the first tab and the second tab respectively, then the electrode assembly and the second end cover are placed into the housing through the second opening, the second end cover seals the second opening, finally the first electrode terminal is electrically connected to the third portion, and the first end cover is bent to seal the first opening. With such structure, assembly of the battery cell with end covers provided at both ends can be smoothly implemented, simplifying a structure of the second adapting member.

According to a second aspect of this application, a battery is provided, including the battery cell in the foregoing embodiment.

According to a third aspect of this application, an electric apparatus is provided, including the battery in the foregoing embodiment, where the battery is configured to supply electric energy to the electric apparatus.

According to a fourth aspect of this application, a manufacturing method for battery cell is provided and includes:
  providing to-be-assembled parts including: a housing, an electrode assembly, a first end cover, and a first adapting member, where a first opening is provided at an end of the housing along a first direction, the first end cover includes an end cover body and a first electrode terminal provided on the end cover body, the electrode assembly includes a main body and a first tab led out from the main body, the first adapting member includes a first portion, a second portion, and a third portion, the second portion is connected to the first portion, a first end of the third portion along a second direction is connected to a side end of the second portion along the second direction, and the second direction is perpendicular to the first direction;
  placing the first adapting member in a way that the first portion is located on a side, from which the first tab is led out, of the main body and the second portion is located on a side of the main body close to the first end cover, and electrically connecting the first portion of the first adapting member to the first tab;

placing the electrode assembly into the housing;

electrically connecting the third portion of the first adapting member to the first electrode terminal; and placing at least part of the third portion between the second portion and the first end cover, and sealing the first opening with the first end cover.

In some embodiments, when the first electrode terminal is electrically connected to the third portion, there is a preset included angle between the third portion and the second portion. Herein, the step of placing at least part of the third portion between the second portion and the first end cover, and sealing the first opening with first end cover includes:

bending, toward the second portion, the third portion along with the first end cover connected to the third portion until the first end cover seals the first opening.

According to a fifth aspect of this application, a manufacturing apparatus of battery cell is provided and includes:

a part provision component, configured to provide a housing, an electrode assembly, a first end cover, and a first adapting member, where a first opening is provided at an end of the housing along a first direction, the first end cover includes an end cover body and a first electrode terminal provided on the end cover body, the electrode assembly includes a main body and a first tab led out from the main body, the first adapting member includes a first portion, a second portion, and a third portion, the second portion is connected to the first portion, a first end of the third portion along a second direction is connected to a side end of the second portion along the second direction, and the second direction is perpendicular to the first direction;

a tab connecting component, configured to: place the first adapting member in a way that the first portion is located on a side, from which the first tab is led out, of the main body and the second portion is located on a side of the main body close to the first end cover; and electrically connect the first portion of the first adapting member to the first tab;

an electrode installment component, configured to place the electrode assembly into the housing through the first opening;

a terminal connecting component, configured to connect the third portion of the first adapting member to the first electrode terminal electrically; and an end cover sealing component, configured to place at least part of the third portion between the second portion and the first end cover, and seal the first opening with the first end cover.

BRIEF DESCRIPTION OF DRAWINGS

To describe the technical solutions in the examples of this application more clearly, the following briefly describes the accompanying drawings required for describing the examples of this application. Apparently, the accompanying drawings in the following descriptions show merely some examples of this application, and persons of ordinary skill in the art may still derive other drawings from the accompanying drawings without creative efforts.

Figure 1:
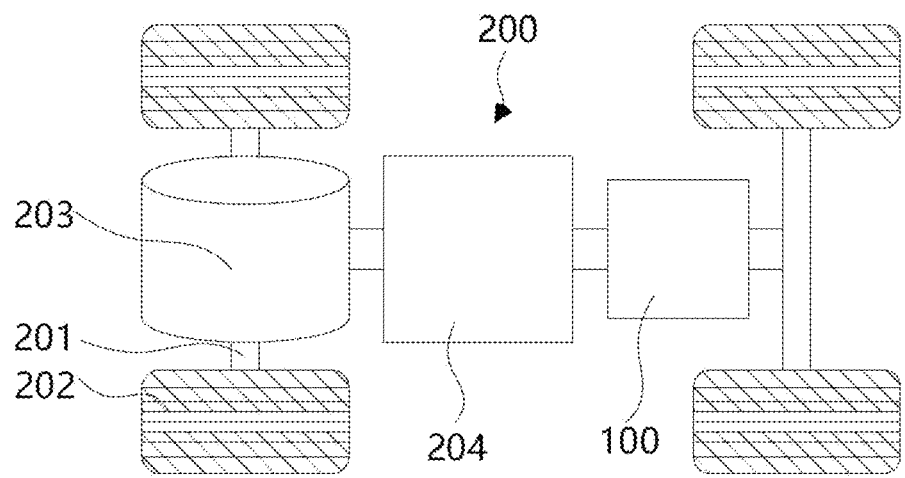
FIG. 1 is a schematic structural diagram of some embodiments with batteries being installed in vehicles according to this application.

The accompanying drawings are not drawn to scale.

REFERENCE SIGNS 200. vehicle; 201. axle; 202. wheel; 203. motor; 204. controller;

100. battery; 100'. battery unit; 101. housing assembly; 101A. box; 101B. cover body; 102. heat management component; 1021. substrate; 1022. heat exchange tube; 1022A. inlet; 1022B. outlet;

10. battery cell; 1. housing; 11. first opening; 11'. second opening; 2. end cover; 21. end cover body; 22. first electrode terminal; 2'. second end cover; 22'. second electrode terminal; 3. electrode assembly; 31. main body; 32. first tab; 32'. second tab; 4. first adapting member; 4'. second adapting member; 41. first portion; 411. positioning groove; 42. second portion; 421. trough; 43. third portion; 44. thickness-reduced portion; 45. through groove; 46. layer structure; and x. first direction; y. second direction; z. third direction; S1. flat surface; S2. arcuate surface.

DESCRIPTION OF EMBODIMENTS

The following further describes the implementations of this application in detail with reference to the accompanying drawings and embodiments. The detailed description of embodiments and the accompanying drawings are intended to illustrate the principle of this application, rather than to limit the scope of this application, meaning this application is not limited to the embodiments described herein.

In the descriptions of this application, it should be noted that, unless otherwise stated, "a plurality of" means at least two; and the orientations or positional relationships indicated by the terms "upper", "lower", "left", "right", "inside", "outside", and the like are merely for ease and brevity of description of this application rather than indicating or implying that the apparatuses or components mentioned must have specific orientations or must be constructed or manipulated according to particular orientations. These terms shall therefore not be construed as limitations on this application.

In addition, the terms "first", "second", and "third", and the like are merely for the purpose of description and shall not be understood as any indication or implication of relative importance. "Perpendicular" is not perpendicular in the strict sense but within an allowable range of error. "Parallel" is not parallel in the strict sense but within an allowable range of error. The orientation terms appearing in the following description all refer to the orientations as shown in the drawings, and do not limit the specific structure of the application.

In the descriptions of this application, it should also be noted that, unless otherwise specified and defined explicitly, the terms "install", "connect" and "join" are to be interpreted broadly. For example, they may refer to a fixed connection, a detachable connection, or an integral connection, and may refer to a direct connection or an indirect connection through an intermediate medium. Persons of ordinary skill in the art can understand specific meanings of these terms in this application as appropriate to specific situations.

In this specification, reference to "embodiment" means that specific features, structures or characteristics described with reference to the embodiment may be incorporated in at least some embodiments of this application. The word "embodiment" appearing in various places in the specification does not necessarily refer to the same embodiment or an independent or alternative embodiment that is exclusive of other embodiments. It is explicitly or implicitly understood by persons skilled in the art that the embodiments described herein may be combined with other embodiments.

In the description of the embodiments of this application, the term "a plurality of" means more than two (inclusive). Similarly, "a plurality of groups" means more than two (inclusive) groups, and "a plurality of pieces" means more than two (inclusive) pieces.

Description of orientations or positional relationships indicated by "upper", "lower", "top", "bottom", "front", "back", "inside", "outside", and the like used in this application are merely for ease of description of this application rather than indicating or implying that the mentioned apparatuses must have specific orientations or be constructed or manipulated according to particular orientations. These terms shall therefore not be construed as limitations on the protection scope of this application.

The battery mentioned in the embodiments of this application is a single physical module that includes multiple battery cells for providing higher voltage and capacity. For example, the battery mentioned in this application may include a battery module, a battery pack, or the like.

The battery cell mentioned in the embodiments of this application may include a lithium-ion secondary battery, a lithium-ion primary battery, a lithium-sulfur battery, a sodium-lithium-ion battery, a sodium-ion battery, a magnesium-ion battery, or the like. This is not limited in the embodiments of this application. The battery cell may be cylindrical, flat, cuboid, or of other shapes, which is not limited in the embodiments of this application either. Battery cells are typically divided into three types by packaging method: cylindrical cell, prismatic cell, and pouch cell. The type of battery is not limited in the embodiments of this application either.

An existing battery cell usually includes a housing and an electrode assembly accommodated in the housing, and the housing is filled with an electrolyte. The electrode assembly is mainly formed by winding or stacking a first electrode plate and a second electrode plate with opposite polarities, and a separator is generally sandwiched between the first electrode plate and the second electrode plate. Parts, coated with active substances, of the first electrode plate and the second electrode plate constitute a main body of the electrode assembly, while parts, uncoated with the active substances, of the first electrode plate and the second electrode plate separately constitute a first tab and a second tab. In the lithium-ion battery, the first electrode plate may be a first electrode plate including a positive electrode current collector and positive electrode active substance layers provided on both sides of the positive electrode current collector. The positive electrode current collector may be made of, for example, aluminum, and the positive electrode active substance may be, for example, lithium cobaltate, lithium iron phosphate, ternary lithium, or lithium manganate. The second electrode plate may be a second electrode plate including a negative electrode current collector and negative electrode active substance layers provided on both sides of the negative electrode current collector, the negative electrode current collector may be made of, for example, copper, and the negative electrode active substance may be, for example, graphite or silicon. The first tab and the second tab may both be at one end of the main body or may be at two ends of the main body respectively. During charging and discharging of the battery cell, a positive electrode active substance and a negative electrode active substance react with an electrolyte, and the tabs are connected to the terminals to form a current loop.

The inventor has found in practice that for most existing cuboid battery cells, an end cover is usually provided on one end surface of the housing, and the end cover includes an end cover body and two electrode terminals provided on the end cover body. During assembly, one adapting member is first welded to each electrode terminal, and then two adapting members were welded to the first tab and the second tab respectively, so that the end cover and the electrode assembly form an integral structure and then the integral structure is placed into the housing.

However, in an actual assembly process, the inventor has found that when the integral structure formed by the end cover and the electrode assembly is placed into the housing, because a gap between the electrode assembly and the housing and a gap between the end cover and the housing are both small, an assembly error is inevitable, and the error is uneasy to adjust, which affects an assembly effect and assembly efficiency.

In addition, for a battery cell with end covers provided on both ends of the housing, one electrode terminal is provided on each end cover, and if an electrode terminal on one end cover is first connected to the electrode assembly through an adapting member to form an integral structure and the integral structure is placed into the housing, after the end cover is sealed, assembly of another end cover and welding of an electrode terminal on the another end cover to a corresponding adapting member cannot be implemented at the same time.

Based on the foregoing findings, the inventor intends to improve the battery cell to further improve assembly performance of the battery cell, so that the assembly method is more versatile for different battery cells.

The battery in this application may be applied to an electric apparatus, and may supply electric energy to the electric apparatus. The apparatus may be a mobile phone, a portable device, a laptop, an electric scooter, an electric vehicle, a steamship, a spacecraft, an electric toy, and an electric tool. For example, the spacecraft includes an airplane, a rocket, a space shuttle, and a spaceship. The electric toy includes a fixed or mobile electric toy, such as a game console, an electric vehicle toy, an electric ship toy, and an electric airplane toy. The electric tool includes an electric metal cutting tool, an electric grinding tool, an electric assembly tool, and an electric railway-specific tool, such as an electric drill, an electric grinder, an electric wrench, an electric screwdriver, an electric hammer, an electric impact drill, a concrete vibrator, and an electric planer.

As shown in FIG. 1, the electric apparatus may be a vehicle 200, for example, anew energy vehicle. The new energy vehicle may be a battery electric vehicle, a hybrid electric vehicle, an extended-range electric vehicle, or the like. Alternatively, the electric apparatus may be an unmanned aerial vehicle, a ship, or the like. Specifically, the vehicle 200 may include an axle 201, wheels 202 connected to the axle 201, a motor 203, a controller 204 and a battery 100. The motor 203 is configured to drive the axle 201 to rotate, the controller 204 is configured to control operation of the motor 203, and the battery 100 may be provided at a bottom, head or rear of the vehicle 200 to supply electric energy for operation of the motor 203 and another component in the vehicle.

Figure 2:
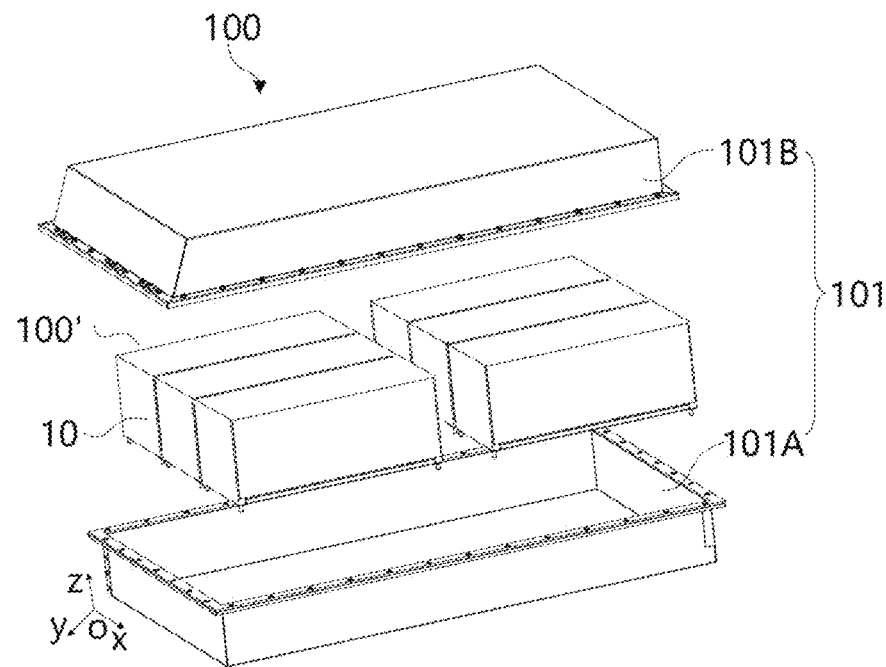
FIG. 2 is an exploded view of some embodiments of a battery according to this application.

As shown in FIG. 2, to meet different power usage requirements, the battery 100 may include a plurality of battery cells 10, where the plurality of battery cells 10 may be connected in series, parallel, or series-parallel, and being connected in series-parallel refers to a combination of series and parallel connections.

FIG. 2 is a schematic structural diagram of some embodiments of a battery 100 according to this application. The battery 100 may include a housing assembly 101 and at least one battery unit 100'. There is a hollow structure inside the housing assembly 101, and at least one battery unit 100' is accommodated in the housing assembly 101.

For example, the housing assembly 101 may include two parts, which are referred to herein as box 101A and cover body 101B respectively. The box 101A and the cover body 101B are fitted together. For example, the box 101A and the cover body 101B each may be a hollow cuboid and have only one surface with an opening, an opening of the box 101A and an opening of the cover body 101B are disposed opposite each other, and the box 101A and the cover body 101B are fitted to form a box with a sealed cavity. Alternatively, the box 101A is a cuboid with an opening and the cover body 101B is plate-shaped, or the cover body 101B is a cuboid with an opening and the box 101A is plate-shaped, and the box 101A and the cover body 101B are disposed opposite each other and fitted to form a box with a sealed cavity. The plurality of battery cells 10 are connected in parallel, series, or series-parallel, and then placed into the sealed cavity formed by snap-fitting the box 101A and the cover body 101B.

Figure 3:
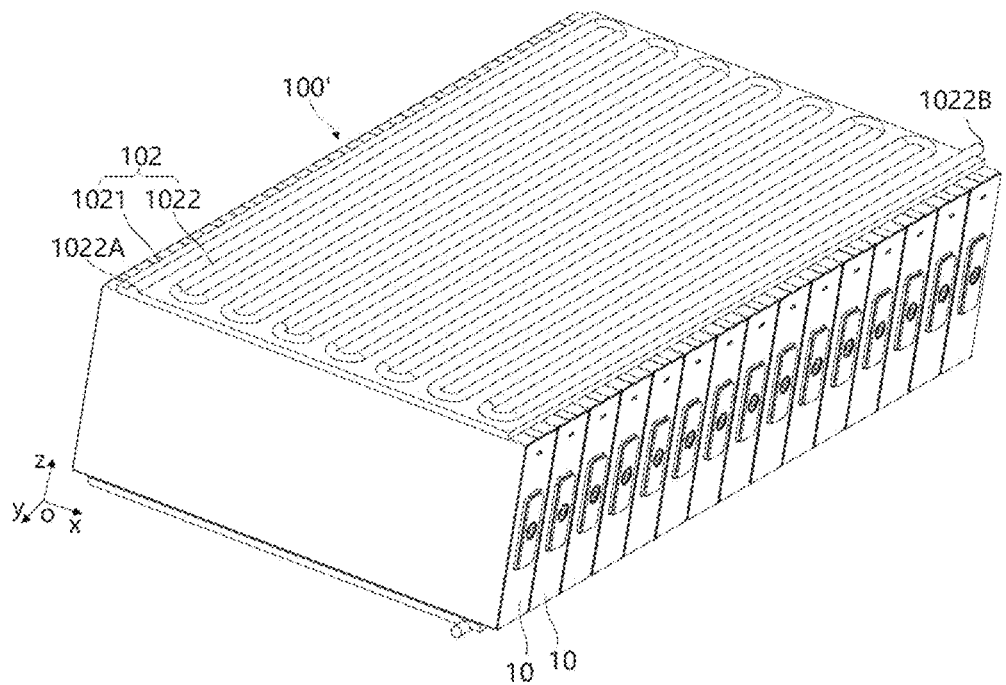
FIG. 3 is a schematic structural diagram of some embodiments of a battery unit according to this application.

As shown in FIG. 3, each battery unit 100' may include a plurality of battery cells 10 that are provided side by side and electrically connected to each other. For example, the plurality of battery cells 10 may be provided side by side along the second direction y.

Figure 4:
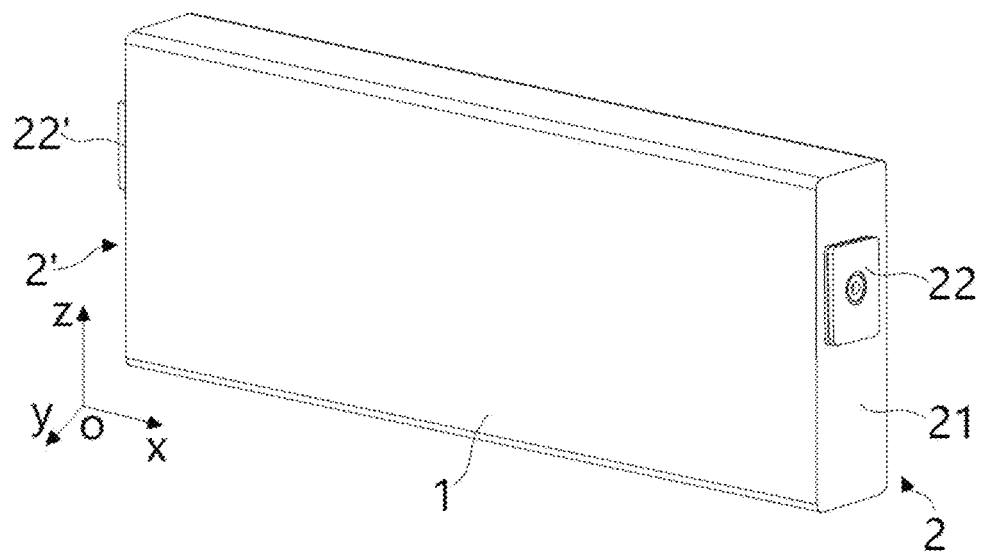
FIG. 4 is a schematic structural diagram of some embodiments of a battery cell according to this application.

As shown in FIG. 4, the battery cell 10 includes a housing 1 and a first end cover 2 and a second end cover 2' respectively provided at two ends of the housing 1 along a first direction x, and the first direction x is perpendicular to the second direction y. Only the first end cover 2 can be schematically shown from such perspective in the figure. The first end cover 2 includes an end cover body 21 and the first electrode terminal 22 provided on the end cover body 21. The second end cover 2 includes an end cover body 21 and a second electrode terminal 22' provided on the end cover body 21, and the first electrode terminal 22 and the second electrode terminal 22' have opposite polarities. Optionally, the housing 1 is provided with the first end cover 2 only at one end along the first direction x, and the first electrode terminal 22 and the second electrode terminal 22' are both provided on the end cover.

The first electrode terminal 22 and the second electrode terminal 22' are not provided in a plane, perpendicular to a third direction z, of the battery unit 100', where the third direction z is perpendicular to the first direction x and the second direction y. Heat management components 102 may be provided on two side surfaces of the battery unit 100' along the third direction y, and are configured for temperature regulation through both opposite side surfaces of the battery unit 100' simultaneously, which can improve temperature regulation efficiency. For example, when the battery 100 operates for long time, this structure can improve heat dissipation performance of the battery 100 and avoid a heat dissipation bottleneck when operating with high power for long time.

In some embodiments, the heat management component 102 is configured to accommodate a fluid to regulate temperature for the battery unit 100'. The fluid herein may be liquid or gas, and regulating temperature refers to heating or cooling the plurality of battery cells. In a case of cooling down or lowering the temperature of the battery unit 100', the heat management component 102 is configured to accommodate a cooling fluid to lower temperature for the plurality of battery cells. In this case, the heat management component 102 may also be referred to as a cooling component, a cooling system, a cooling plate, or the like, and the fluid accommodated therein may also be referred to as a cooling medium or cooling fluid, and more specifically, may be referred to as a cooling liquid or cooling gas. In addition, the heat management component 102 may also be configured to heat up the plurality of battery cells. This is not limited in this embodiment of this application. Optionally, the fluid may circulate, to implement a better temperature regulation effect. Optionally, the fluid may be water, a mixture of water and ethylene glycol, air, or the like.

Specifically, the heat management component 102 may include: a substrate 1021 and a heat exchange tube 1022 provided on the substrate 1021. The heat exchange tube 1022 covers an entire surface of the battery unit 100' in a continuous S-shaped path or another extending path to achieve better heat exchange effects. A channel for fluid flow is formed in the heat exchange tube 1022, and two ends of the heat exchange tube 1022 serve as an inlet 1022A and an outlet 1022B for exchanging a heat fluid respectively. Alternatively, the heat management component 102 may include a substrate 1021, and a heat exchange channel for fluid flow is provided in the substrate 1021.

Optionally, the heat management component 102 can also regulate the temperature by controlling a conductive component.

Figure 5:
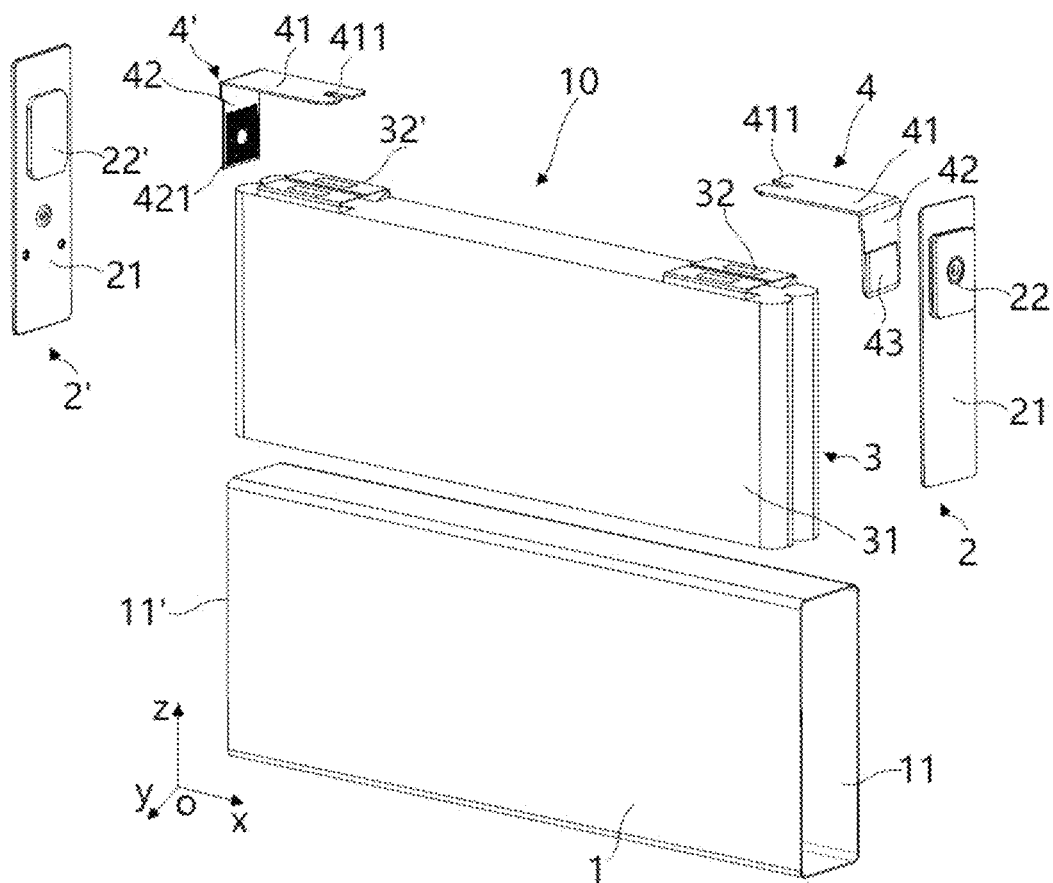
FIG. 5 is an exploded view of some embodiments of a battery cell according to this application.

FIG. 5 is an exploded view of some embodiments of a battery cell 10 according to this application. The battery cell 10 includes a housing 1, a first end cover 2, an electrode assembly 3, and a first adapting member 4.

A first opening 11 is provided at one end of the housing 1 along a first direction x. The first end cover 2 is configured to seal the first opening 11, where the first end cover 2 includes an end cover body 21 and a first electrode terminal 22 provided on the end cover body 21. The electrode assembly 3 is provided inside the housing 1, where the electrode assembly 3 includes a main body 31 and a first tab 32 led out from the main body 31.

The first adapting member 4 includes a first portion 41, a second portion 42, and a third portion 43, where the first portion 41 is located on a side, from which the first tab 32 is led out, of the main body 31 and is electrically connected to the first tab 32, the second portion 42 is located on a side of the main body 31 close to the first end cover 2 and is connected to the first portion 41, a first end of the third portion 43 along a second direction y is connected to a side end of the second portion 42 along the second direction y, and at least part of the third portion 43 is located between the second portion 42 and the end cover body 21 and is electrically connected to the first electrode terminal 22, where the second direction y is perpendicular to the first direction x.

Herein, the housing 1 is a component for accommodating the electrode assembly 3. The housing 1 may be a hollow structure with a first opening 11 provided at one end, and is sealed with the first end cover 2; or the housing 1 may be a hollow structure with a first opening 11 and a second opening 11' provided at two ends respectively, the first opening 11 being sealed with the first end cover 2 and the second opening 11' being sealed with the second end cover 2'. The housing 1 may be made of various materials, such as copper, iron, aluminum, steel, and aluminum alloy. The housing 1 may be a cuboid or the like.

The first end cover 2 is a component that covers the first opening 11 of the housing 1 to isolate an internal environment of the battery cell 10 from an external environment. The first end cover 2 may match the housing body 1 in shape. For example, the housing body 1 is a cuboid structure. The first end cover 2 is a rectangular plate-shaped structure that matches the housing body 1. The first end cover 2 may also be made of various materials, for example, copper, iron, aluminum, steel and aluminum alloy. The material of the first end cover 2 and the material of the housing 1 may be the same or different.

The electrode assembly 3 is a component in which electrochemical reactions occur in the battery cell 10. The electrode assembly 3 may be a cuboid or the like. The electrode assembly 3 may include a first electrode plate, a second electrode plate, and a separator. The electrode assembly 3 may be a winding structure formed by winding the first electrode plate, the separator and the second electrode plate. The winding structure may include two flat surfaces S1 and two arcuate surfaces S2, the two flat surfaces S1 are disposed opposite each other along the second direction y, and the flat surfaces S1 are perpendicular to the second direction y. Two ends of the arcuate surface S2 are respectively connected to ends of the two flat surfaces S1 on the same side. Optionally, the electrode assembly 3 may alternatively be a stacked structure formed by stacking the first electrode plate, the separator, and the second electrode plate.

For example, the first electrode plate may be a positive electrode plate, including a positive electrode current collector and positive electrode active substance layers applied to two opposite sides of the positive electrode current collector, and a part, uncoated with the positive electrode active substance layer, of the first electrode plate forms a first tab 32. The second electrode plate may be a negative electrode plate, including a negative electrode current collector and negative electrode active substance layers applied to two opposite sides of the negative electrode current collector, and a part, uncoated with the negative electrode active substance layer, of the second electrode plate forms a second tab 32'. The first tab 32 and the second tab 32' have opposite polarities. A part of the first electrode plate other than the first tab 32 and a part of the second electrode plate other than the second tab 32' form a main body 31 after being wound or stacked.

The first adapting member 4 is configured to electrically connect the first tab 32 to the first electrode terminal 22, is made of a conductive material, and may be formed by tailoring and bending a thin plate. The first portion 41 is located on a side, from which the first tab 32 is led out, of the main body 31 and is electrically connected to the first tab 32, for example, by welding. The second portion 42 is located on a side of the main body 31 close to the first end cover 2. Specifically, the second portion 42 is provided perpendicular to the first direction x, and the second portion 42 is connected to the first portion 41.

A first end of the third portion 43 along the second direction y is connected to a side end of the second portion 42 along the second direction y. In FIG. 5, a side end, connected to the first portion 41, of the second portion 42 is close to a side end connected to the third portion 43. Optionally, a side end, connected to the first portion 41, of the second portion 42 and a side end connected to the third portion 43 may alternatively be disposed opposite each other. For example, the first portion 41, the second portion 42, and the third portion 43 each may have a rectangular structure. Before the first opening 11 is sealed with the first end cover 2, the third portion 43 is provided in a bendable manner relative to the second portion 42 under action of external force, and a connecting edge between the third portion 43 and the second portion 42 serves as a rotation axis.

For the first adapting member 4 in this embodiment, the second portion 42 is extended to form the third portion 43, so that an included angle is formed between the third portion 43 and the second portion 42 when the third portion 43 is electrically connected to the first electrode terminal 22; and an operation space connecting the third portion 43 and the first electrode terminal 22 is formed in a zone where the included angle is located, which can improve convenience of assembly and improve reliability of an electrical connection. After the third portion 43 is electrically connected to the first electrode terminal 22, the third portion 43 and the first end cover 2 are bent along directly around a rotation axis toward the second portion 42, so that the first end cover 2 seals the first opening 11. Therefore, with such structure, the electrical connection between the third portion 43 and the first electrode terminal 22 and the assembly of the first end cover 2 can be skillfully implemented.

In addition, the electrode assembly 3 is first placed into the housing 1 and then the first end cover 2 is installed, which also easily ensures accuracy of matching between the first end cover 2 and the first opening 11, avoids larger force between the first end cover 2 and the housing 1 and larger force between the electrode assembly 3 and the housing 1, and optimizes assembly performance, thereby improving performance and operating reliability of the battery cell 10.

In addition, if a second opening 11' is provided at another end of the battery cell 10 along the first direction x and the second opening 11' is sealed with the second end cover 2', the first end cover 2 may be installed last during assembly, to resolve the problem that the electrical connection between the third portion 43 and the first electrode terminal 22 and the assembly of the first end cover 2 cannot be implemented simultaneously. Therefore, such assembly manner may be applied to battery cells 10 with different structures, not requiring special matching between the structures of the battery cells 10 and assembly processes, featuring great versatility.

For a battery cell 10 with a relatively large ratio of a size in the first direction x to a size in the third direction z, that is, a battery cell of a large length and a small height, the first end cover 2 is provided at an end of the housing 1 along the first direction, which can prevent the first electrode terminal 22 from occupying extra space in the third direction z and can improve utilization of the battery cell 10 in the third direction z and increase energy density of the battery cell 10.

In some embodiments, as shown in FIG. 5, the second direction y is consistent with a thickness direction of the electrode assembly 3.

Herein, for the wound electrode assembly 3, a thickness direction thereof is a direction perpendicular to a flat surface S1; and for a stacked electrode assembly 3, a thickness direction is a stacking direction of the first electrode plate and the second electrode plate. One electrode assembly 3 may be provided; or multiple electrode assemblies 3 may be stacked along the second direction y. In order to position the first adapting member 4 along the second direction y, a positioning groove 411 is provided at a middle position of the first portion 41 along the second direction y.

The third portion 43 may be provided facing the first electrode terminal 22 along the first direction x, an extension length of the second portion 42 along the third direction z may be designed based on an installation position of the third portion 43, and an end of the second portion 42 farther away from the first portion 41 may be flush with or exceed the third portion 43.

In this embodiment, when the third portion 43 and the first end cover 2 are bent along around a rotation axis toward the second portion 42, the first end cover 2 may be rotated based on a longer edge of the first end cover 2 to seal the first opening 11, which can reduce a rotation radius of the first end cover 2, reduce misalignment and shaking in a rotation process, and fit the first end cover 2 into the first opening 11 accurately, thereby ensuring uniformity of all circumferential gaps between the first end cover 2 and the first opening 11 and improving welding effects of the first end cover 2 and the housing 1.

In addition, the size of the electrode assembly 3 in the thickness direction is relatively small, and the size of the second portion 42 along the second direction y is also correspondingly small, so that the second portion 42 is not easily deformed due to bending of the third portion 43. In addition, with such structure, the position, connected to a side end of the second portion 42, of the third portion 43 can be flexibly designed to fit a position of the first electrode terminal 22.

In some embodiments, as shown in FIG. 5, a first tab 32 is led out from a side end of the main body 31 along a third direction z, and the third direction z is perpendicular to the first direction x and the second direction y.

Herein, in order to facilitate connection between the first tab 32 to the first portion 41 and reduce a length of the first portion 41, the first tab 32 is located at an end of the main body 31 along the first direction x. The first tab 32 is led out from a side end of the main body 31 along the third direction z. For the wound electrode assembly 3, a winding axis is disposed along the third direction. With such structure, it can be ensured that an entire end of the electrode assembly 3 along the winding axis is immersed in an electrolyte, so that the first electrode plate and the second electrode plate are uniformly immersed in the electrolyte along the entire extension length, ensuring exertion of electrochemical performance of the electrode assembly 3 and improving performance of the battery cell 10.

In this embodiment, the first tab 32 is provided on a side surface of the main body 31 close to the first end cover 2, so that an independent operation space is present when the first tab 32 and the first electrode terminal 22 are electrically connected to the first adapting member 4, thereby facilitating assembly and ensuring reliability of the electrical connection. In addition, the first portion 41 and the second portion 42 are on two close side surfaces of the main body 31 and form an L-shaped structure; and the third portion 43 and the second portion 42 form an included angle before assembly, for example, the third portion 43 and the second portion 42 are perpendicular to each other. The third portion 43 is located at a side end of the second portion 42 along the second direction y, which can improve overall rigidity of the first adapting member 4. In this way, the second portion 42 is not easily deformed during placement, transfer, or assembly of parts.

In some embodiments, the electrode assembly 3 further includes a second tab 32' led out from the main body 31, and the first tab 32 and the second tab 32' have opposite polarities and are led out from the same side end of the main body 31.

In this embodiment, an occupied space of the battery cell 10 in the third direction z can be reduced, and the energy density of the battery cell 10 is increased.

In some embodiments, as shown in FIG. 5, a second end of the third portion 43 along the second direction y is a free end, and the third portion 43 is configured to bend, along with the first end cover 2 connected to the third portion 43, toward the second portion 42, so that the first end cover 2 seals the first opening 11.

Figure 6:
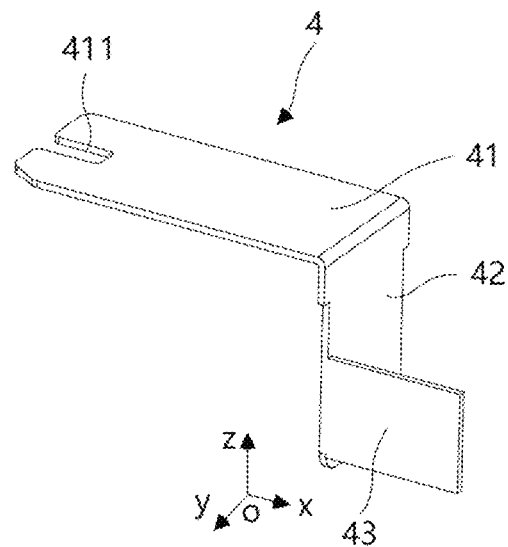
FIG. 6 is a schematic structural diagram of some embodiments of a first adapting member in a battery cell according to this application.

Herein, as shown in FIG. 6, before bending, the third portion 43 and the second portion 42 form an included angle, so that the third portion 43 and the first electrode terminal 22 are electrically connected, for example, being welded, in the zone in which the angle is located. After the third portion 43 is electrically connected to the first electrode terminal 22, the third portion 43 is bent around a connecting edge of the third portion 43 and the second portion 42 until the first end cover 2 seals the first opening 11. After bending, if projection of the third portion 43 on a plane perpendicular to the first direction x is located in the second portion 42, the entire third portion 43 is located between the second portion 42 and the first end cover 2; or if projection of the third portion 43 on a plane perpendicular to the first direction x exceeds an edge of the second portion 42, part of the third portion 43 is located between the second portion 42 and the first end cover 2.

In this embodiment, the electrical connection between the third portion 43 and the first electrode terminal 22 and the assembly of the first end cover 2 can be implemented by using an assembly method for bending the third portion 43. During assembly, the electrode assembly 3 may be first placed into the housing 1 and then the first end cover 2 is installed, which easily ensures accuracy of matching between the first end cover 2 and the first opening 11 and facilitates welding of the first end cover 2 and the first opening 11, thereby optimizing assembly performance. In addition, for a battery cell 10 with end covers provided at both ends, the first end cover 2 may be installed last during assembly, to resolve the problem that the electrical connection between the third portion 43 and the first electrode terminal 22 and the assembly of the first end cover 2 cannot be implemented simultaneously. In this way, such assembly process is highly versatile for battery cells 10 with different structures.

In some embodiments, as shown in FIG. 5, the first portion 41, the second portion 42, and the third portion 43 are all plate-shaped structures, the first portion 41 and the second portion 42 are provided perpendicularly, and the second portion 42 and the third portion 43 are provided in parallel and are both perpendicular to the first direction x.

In this embodiment, the first portion 41 and the second portion 42 are provided perpendicularly, and after the first portion 41 is electrically connected to the first tab 32, the second portion 42 may be provided parallel to a side surface, facing the first end cover 2, of the main body 31, to reduce space occupied by the second portion 42 in the first direction x. In addition, after the third portion 43 is bent until the first end cover 2 seals the first opening 11, the second portion 42 and the third portion 43 are provided in parallel or, for example, can come into contact with each other or maintain a small gap, which can further reduce the space occupied by the second portion 42 in the first direction x.

In some embodiments, as shown in FIG. 6, a position, connected to the third portion 43, of the second portion 42 is retracted by a preset distance relative to an outer edge of the second portion 42 along the second direction y.

In this embodiment, a root position of the third portion 43 is retracted by a preset distance relative to an outer edge of the second portion 42, which can prevent the third portion 43 from exceeding the outer edge of the second portion 42 along the second direction y and coming into contact with the housing 1 after being bent, thereby ensuring a gap between the electrode assembly 3 and housing 1 after assembly and a gap between the first end cover 2 and the housing 1.

Figure 7A:
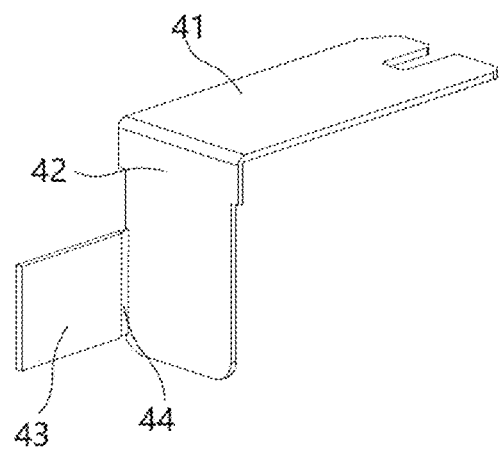
FIG. 7A, FIG. 7B, and FIG. 7C are respectively schematic structural diagrams of three different forms of weak zones provided on the first adapting member.
Figure 7B:
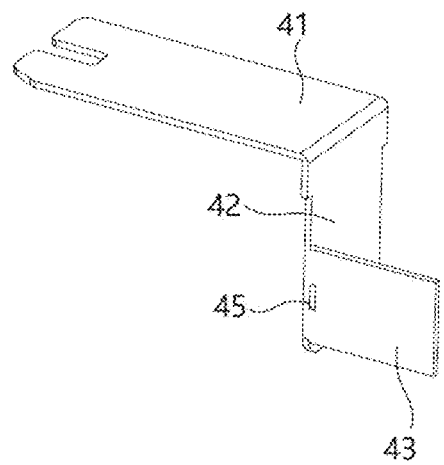
Figure 7C:
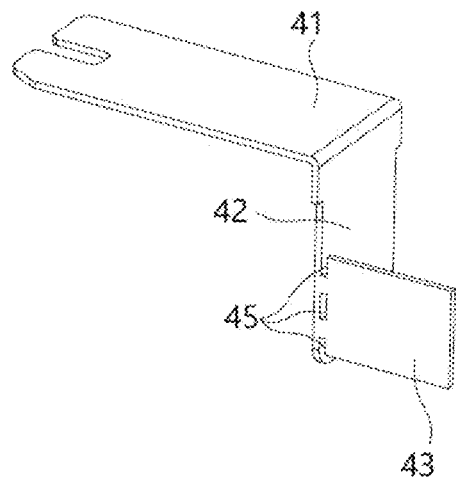

In some embodiments, as shown in FIG. 7A to FIG. 7C, a weak zone is provided at a joint between the third portion 43 and the second portion 42. The weak zone is to weaken strength of the joint between the third portion 43 and the second portion 42 through a structural setting, which better facilitates deformation.

In this embodiment, the weak zone is provided at the joint between the third portion 43 and the second portion 42, and after the third portion 43 is connected to the first electrode terminal 22 electrically, the third portion 43 and the first end cover 2 are jointly bent toward the second portion 42 easily, which can avoid applying extra force to a joint between the first portion 41 and the first tab 32 and affecting connection effects, and can also prevent large bending force from deforming the first adapting member 4 during bending. In this way, a bending position of the third portion 43 relative to the second portion 42 is accurate, and higher positioning accuracy after the first end cover 2 seals the first opening 11 makes circumferential gaps between the first end cover 2 and the first opening 11 uniform, thereby improving welding effects.

For example, the weak zone includes at least one of a thickness-reduced portion 44 and a through groove 45 extending along the third direction z, and the third direction z is perpendicular to the first direction x and the second direction y. Three disposition forms of weak zones are provided below.

In the first structure, as shown in FIG. 7A, the weak zone includes the thickness-reduced portion 44 extending along the third direction z, and the thickness-reduced portion 44 extends along the entire length of the third portion 43 in the third direction z, or one or more segments of thickness-reduced portions 44 may be provided to extend along partial length of the third portion 43. With such structure, external force required for bending the third portion 43 may be controlled through thickness of the thickness-reduced portion 44.

The thickness-reduced portion 44 may be provided on an inner side surface, connected to the second portion 42, of the third portion 43, to facilitating bending, so that the third portion 43 comes closer to the second portion 42 after being bent, thereby reducing a space occupied by the third portion 43 in the first direction x.

In the second structure, as shown in FIG. 7B, the weak zone includes a through groove 45 extending along the third direction z, the through groove 45 may be an elongated groove, the through groove 45 extends along partial length of the third portion 43 in the third direction z, and the through groove 45 may be provided in the middle of the third portion 43 along the third direction z. This structure is easier to process and does not require precise control of thinning thickness.

In the third structure, as shown in FIG. 7C, the weak zone includes a plurality of spaced-apart through grooves 45 extending along the third direction z. For example, three through grooves 45 may be provided, one through groove 45 is provided at a middle position of the third portion 43 along the third direction z, the other two through grooves 45 are respectively provided in upper and lower zones of the third portion 43 along the third direction z, and respective outer ends of the two through grooves 45 may be sealed or unsealed. This structure not only facilitates processing, but also facilitates bending of the third portion 43 by better weakening strength of a connection portion between the second portion 42 and the third portion 43 via arrangement of a plurality of spaced-apart through grooves 45.

In some embodiments, the first adapting member 4 may be formed by bending a single-layer thin plate. This type of first adapting member 4 is simple in structure, easy to process, and low in costs.

Figure 8:
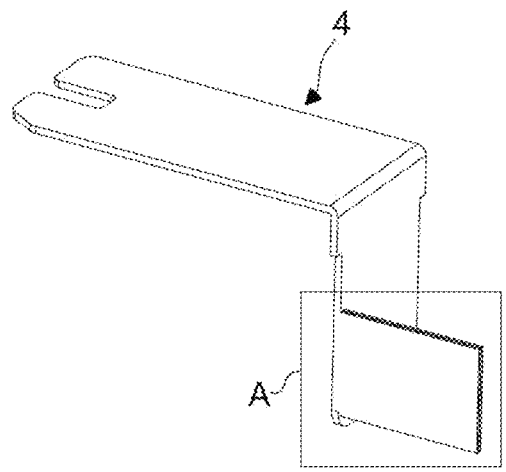
FIG. 8 is a schematic structural diagram of some other embodiments of a first adapting member in a battery cell according to this application.
Figure 9:
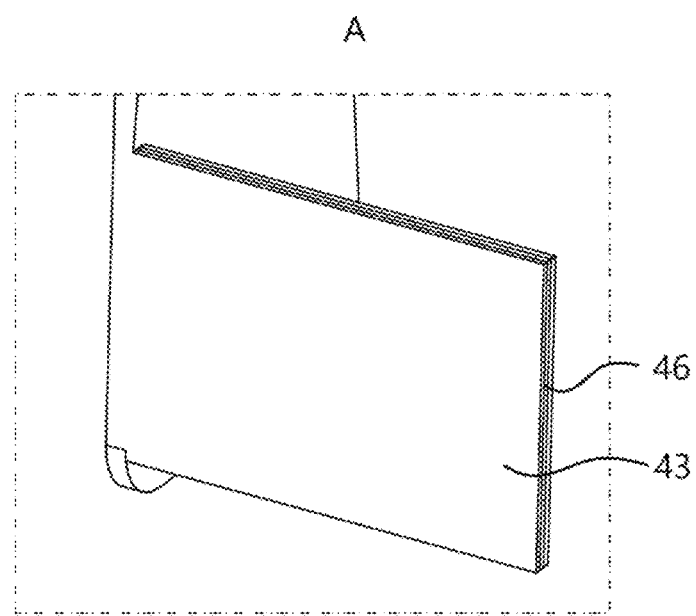
FIG. 9 is an enlarged view of position A in FIG. 8.

In some embodiments, as shown in FIG. 8 and FIG. 9, the first adapting member 4 is formed by stacking a plurality of layer structures 46. Because each layer structure 46 is relatively thin, the first adapting member 4 formed by stacking the plurality of layer structures 46 can reduce rigidity of the joint between the second portion 42 and the third portion 43, so that the third portion 43 is easier to bend.

In some embodiments, a second opening 11' is provided at another end of the housing 1 along the first direction x, the electrode assembly 3 further includes a second tab 32' led out from the main body 31, and the battery cell 10 further includes: a second end cover 2' and a second adapting member 4'. The second end cover 2' is configured to seal the second opening 12, where the second end cover 2' includes an end cover body 21 and a second electrode terminal 22' provided on the end cover body 21. The second adapting member 4' includes a first portion 41 and a second portion 42, where the first portion 41 is located on a side, from which the second tab 32' is led out, of the main body 31 and is electrically connected to the second tab 32', the second portion 42 is on a side, close to the second end cover 2', of the main body 31 and is connected to the first portion 41, and the second portion 42 is electrically connected to the second electrode terminal 22'.

Herein, a plurality of troughs 421 are provided on the side, farther away from the second electrode terminal 22', of the second portion 42, and the plurality of troughs 421 are densely distributed in a zone corresponding to the second electrode terminal 22', to absorb redundant laser beams through the plurality of troughs 421, reduce laser beam reflection, and ensure welding effects when the second portion 42 and the second electrode terminal 22' are welded on the side of the second portion 42 farther away from the second end cover 2'.

In this embodiment, when the battery cell 10 has both the first end cover 2 and the second end cover 2', the second electrode terminal 22' may be first electrically connected to the second portion 42 of the second adapting member 4', then respective first portions 41 of the first adapting member 4 and the second adapting member 4' are electrically connected to the first tab 32 and the second tab 32' respectively, then the electrode assembly 3 and the second end cover 2' are placed into the housing 1 through the second opening 11', the second end cover 2' seals the second opening 11', finally the first electrode terminal 22 is electrically connected to the third portion 43, and the first end cover 2 is bent to seal the first opening 11. With such structure, assembly of the battery cell 10 with end covers provided at both ends can be smoothly implemented, simplifying a structure of the second adapting member 4'.

Optionally, the second adapting member 4' can also use the same structure as the first adapting member 4, and the second end cover 2' is assembled in the same method as the first end cover 2. This structure requires only one type of adapting member, which can reduce types of parts, simplify the structure of the battery cell 10, and reduce types of assembly processes.

FIG. 5 is used as an example below to provide a specific embodiment of the battery cell 10 in this application.

The battery cell 10 includes: a housing 1, a first end cover 2, a second end cover 2', an electrode assembly 3, a first adapting member 4, and a second adapting member 4'.

A first opening 11 and a second opening 11' are provided respectively at two ends of the housing 1 along a first direction x'. The first end cover 2 is configured to seal the first opening 11, where the first end cover 2 includes an end cover body 21 and a first electrode terminal 22 provided on the end cover body 21. The second end cover 2' includes an end cover body 21 and a second electrode terminal 22' provided on the end cover body 21. The electrode assembly 3 is provided inside the housing 1, where the electrode assembly 3 includes a main body 31 and a first tab 32 and a second tab 32' led out from a same end of the main body 31 along a third direction z.

The first adapting member 4 includes a first portion 41, a second portion 42, and a third portion 43, where the first portion 41 is located on a side, from which the first tab 32 is led out, of the main body 31 and is electrically connected to the first tab 32, the second portion 42 is located on a side of the main body 31 close to the first end cover 2 and is connected to the first portion 41, a first end of the third portion 43 along a second direction y is connected to a side end of the second portion 42 along the second direction y, the third portion 43 is provided in a bendable manner by using a connecting edge between the third portion 43 and the second portion 42 as a rotation axis, and at least part of the third portion 43 is located between the second portion 42 and the end cover body 21 and is electrically connected to the first electrode terminal 22, where the second direction y is perpendicular to the first direction x and is consistent with the thickness direction of the electrode assembly 3.

The second adapting member 4' includes a first portion 41 and a second portion 42, where the first portion 41 is located on a side, from which the second tab 32' is led out, of the main body 31 and is electrically connected to the second tab 32', the second portion 42 is on a side, close to the second end cover 2', of the main body 31 and is connected to the first portion 41, and the second portion 42 is electrically connected to the second electrode terminal 22'.

During assembly of such battery cell 10, the following steps are performed:

1. Electrically connect the second portion 42 of the second adapting member 4' to the second electrode terminal 22', for example, by welding from the side of the second portion 42 farther away from the second electrode terminal 22'; place the first portion 41 of the second adapting member 4' on the side, from which the second tab 32' is led out, of the main body 31; and electrically connect the first portion 41 of the second adapting member 4' to the second tab 32'.

2. Place the first adapting member 4 in a way that the first portion 41 is located on a side, from which the first tab 32 is led out, of the main body 31 and the second portion 42 is located on a side of the main body 31 close to the first end cover 2; and electrically connect the first portion 41 of the first adapting member 4 to the first tab 32.

Figure 10:
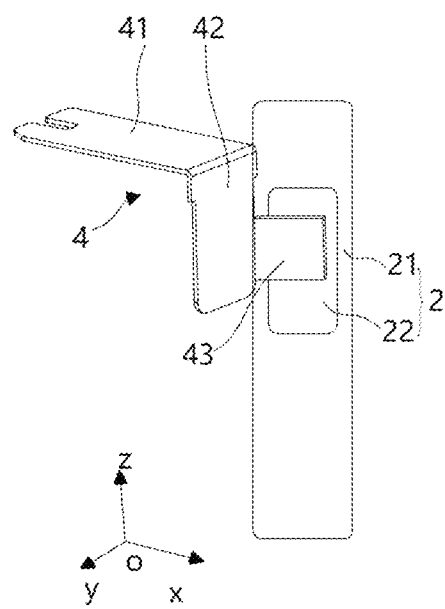
FIG. 10 is a schematic structural diagram of a second portion of a first adapting member being in an unbent state after being electrically connected to a first electrode terminal.

3. Place the electrode assembly 3 along with the second end cover 2', the second adapting member 4', and the first adapting member 4 into the housing 1 through the second opening 11', and seal the second opening 11' with the second end cover 2'. As shown in FIG. 10, in this case, the third portion 43 and the second portion 42 of the first adapting member 4 may form an included angle.

4. Electrically connect the third portion 43 to the first electrode terminal 22 by performing an operation in a space between the second portion 42 and the third portion 43 of the first adapting member 4.

Figure 11:
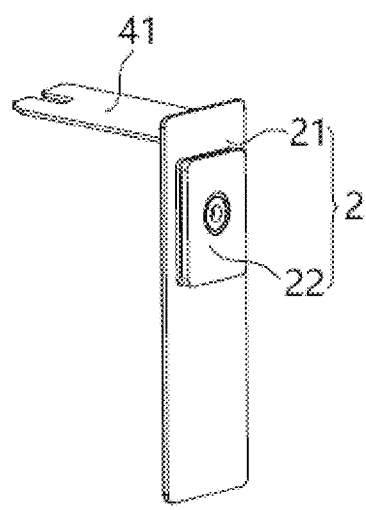
FIG. 11 is a schematic structural diagram of bending a second portion of a first adapting member along with a first end cover.

5. Bend, toward the second portion 42, the third portion 43 along with the first end cover 2 connected to the third portion 43 until the first end cover 2 seals the first opening 11 in a state shown in FIG. 11.

6. Weld the first end cover 2 and the second end cover 2' to the housing 1.

Figure 12:
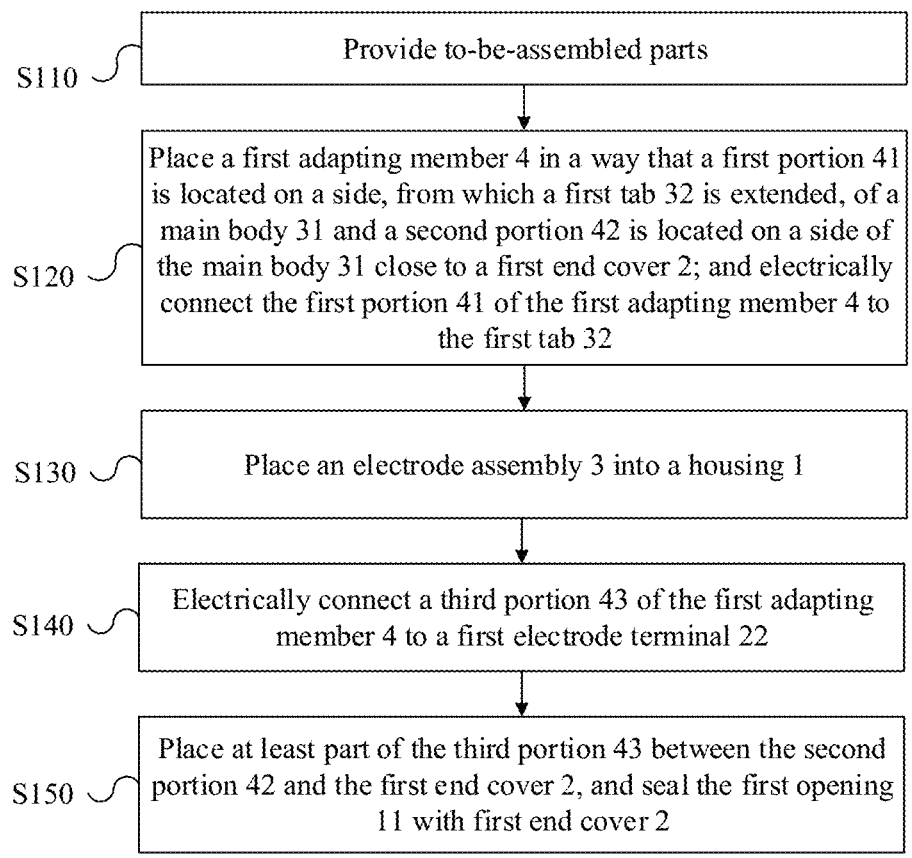
FIG. 12 is a schematic structural diagram of some embodiments of a manufacturing method for battery cell according to this application.

Next, this application further provides a manufacturing method for battery cell 10, as shown in FIG. 12, including:

S110. Provide to-be-assembled parts, including: a housing 1, an electrode assembly 3, a first end cover 2, and a first adapting member 4, where a first opening 11 is provided at an end of the housing 1 along a first direction x, the first end cover 2 includes an end cover body 21 and a first electrode terminal 22 provided on the end cover body 21, the electrode assembly 3 includes a main body 31 and a first tab 32 led out from the main body 31, the first adapting member 4 includes a first portion 41, a second portion 42, and a third portion 43, the second portion 42 is connected to the first portion 41, a first end of the third portion 43 along a second direction y is connected to a side end of the second portion 42 along the second direction y, and the second direction y is perpendicular to the first direction x.

S120. Place the first adapting member 4 in a way that the first portion 41 is located on a side, from which the first tab 32 is led out, of the main body 31 and the second portion 42 is located on a side of the main body 31 close to the first end cover 2; and electrically connect the first portion 41 of the first adapting member 4 to the first tab 32.

S130. Place the electrode assembly 3 into the housing 1.

S140. Electrically connect the third portion 43 of the first adapting member 4 to the first electrode terminal 22.

S150. Place at least part of the third portion 43 between the second portion 42 and the first end cover 2, and seal the first opening 11 with first end cover 2.

Herein, S110 to S150 are performed sequentially. In S130, if the second adapting member 4' is also provided with the third portion 43, the electrode assembly 3 may be placed through the first opening 11 or the second opening 11'; or if the second adapting member 4' is not provided with the third portion 43, the electrode assembly 3 and the second end cover 2' need to be placed into the housing 1 through the second opening 11'. In S140, before the third portion 43 is electrically connected to the first electrode terminal 22, the first end cover 2 needs to be positioned first to ensure an even gap between the first end cover 2 and an inner wall of the housing 1 after the first end cover 2 seals the first opening 11.

For the first adapting member 4 in this embodiment, the second portion 42 is extended to form the third portion 43, so that an included angle is formed between the third portion 43 and the second portion 42 when the third portion 43 is electrically connected to the first electrode terminal 22; and an operation space connecting the third portion 43 and the first electrode terminal 22 is formed in a zone where the included angle is located, which can improve convenience of assembly and improve reliability of an electrical connection. After the third portion 43 is electrically connected to the first electrode terminal 22, the third portion 43 and the first end cover 2 are bent along directly around a rotation axis toward the second portion 42, so that the first end cover 2 seals the first opening 11. Therefore, with such structure, the electrical connection between the third portion 43 and the first electrode terminal 22 and the assembly of the first end cover 2 can be skillfully implemented.

In addition, the electrode assembly 3 is first placed into the housing 1 and then the first end cover 2 is installed, which also easily ensures accuracy of matching between the first end cover 2 and the first opening 11, avoids larger force being applied between the first end cover 2 and the housing 1 and applied between the electrode assembly 3 and the housing 1, and optimizes assembly performance, thereby improving performance and operating reliability of the battery cell 10.

In some embodiments, when the first electrode terminal 22 is electrically connected to the third portion 43, there is a preset included angle between the third portion 43 and the second portion 42, for example, a right angle or another angle. Herein, step S150 of placing at least part of the third portion 43 between the second portion 42 and the first end cover 2, and sealing the first opening 11 with first end cover 2 includes:

bending, toward the second portion 42, the third portion 43 along with the first end cover 2 connected to the third portion 43 until the first end cover 2 seals the first opening 11.

In this embodiment, the third portion 43 is provided in a bendable manner relative to the second portion 42. During electrical connection, there is a preset included angle between the third portion 43 and the second portion 42, to provide an operation space for the electrical connection (for example, welding) between the third portion 43 and the first electrode terminal 22; and after the electrical connection, external force is applied to the first end cover 2, so that the third portion 43 is bent around the connection edge between the third portion 43 and the second portion 42 until the first end cover 2 seals the first opening 11. Therefore, in this embodiment, the electrical connection between the third portion 43 and the first electrode terminal 22 and the assembly of the first end cover 2 can be implemented by using an assembly method for bending the third portion 43.

In some embodiments, a second opening 11' is provided at another end of the housing 1 along the first direction x, the electrode assembly 3 further includes a second tab 32' led out from the main body 31, and the battery cell 10 further includes: a second end cover 2' and a second adapting member 4'. The second end cover 2' is configured to seal the second opening 12, where the second end cover 2' includes an end cover body 21 and a second electrode terminal 22' provided on the end cover body 21. The second adapting member 4' includes a first portion 41 and a second portion 42. The manufacturing method in this application further includes:

S115. Electrically connect the second portion 42 of the second adapting member 4' to the second electrode terminal 22'; place the first portion 41 of the second adapting member 4' on the side, from which the second tab 32' is led out, of the main body 31; and electrically connect the first portion 41 of the second adapting member 4' to the second tab 32'.

The placing the electrode assembly 3 into the housing 1 in S130 includes: placing the electrode assembly 3 along with the second end cover 2', the second adapting member 4', and the first adapting member 4 into the housing 1 through the second opening 11', and sealing the second opening 11' with the second end cover 2'.

Herein, S115, not shown in the figure, is performed between S110 and S120. In S115, if welding is performed to electrically connect the second portion 42 to the second electrode terminal 22', welding may be performed on a side surface, farther away from the second electrode terminal 22', of the first portion 41 of the second adapting member 4'.

Figure 13:
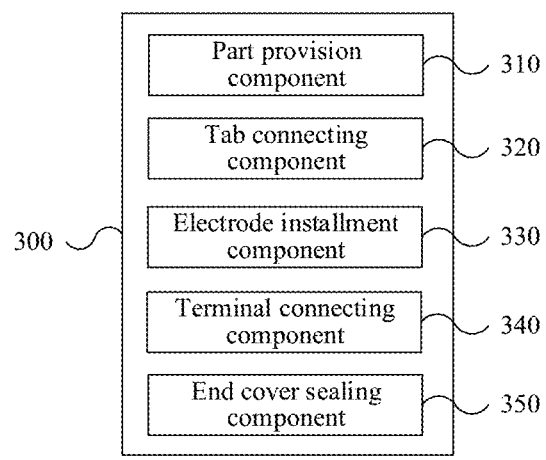
FIG. 13 is a schematic diagram of module composition of some embodiments of a manufacturing apparatus of battery cell according to this application.

Finally, this application provides a manufacturing apparatus 300 of battery cell 10. In some embodiments, as shown in FIG. 13, the manufacturing apparatus 300 includes:

a part provision component 310, configured to provide a housing 1, an electrode assembly 3, a first end cover 2, and a first adapting member 4, where a first opening 11 is provided at an end of the housing 1 along a first direction x, the first end cover 2 includes an end cover body 21 and a first electrode terminal 22 provided on the end cover body 21, the electrode assembly 3 includes a main body 31 and a first tab 32 led out from the main body 31, the first adapting member 4 includes a first portion 41, a second portion 42, and a third portion 43, the second portion 42 is connected to the first portion 41, a first end of the third portion 43 along a second direction y is connected to a side end of the second portion 42 along the second direction y, and the second direction y is perpendicular to the first direction x;

a tab connecting component 320, configured to: place the first adapting member 4 in a way that the first portion 41 is located on a side, from which the first tab 32 is led out, of the main body 31 and the second portion 42 is located on a side of the main body 31 close to the first end cover 2; and electrically connect the first portion 41 of the first adapting member 4 to the first tab 32;

an electrode installment component 330, configured to place the electrode assembly 3 into the housing 1 through the first opening 11;

a terminal connecting component 340, configured to electrically connect the third portion 43 of the first adapting member 4 to the first electrode terminal 22; and an end cover sealing component 350, configured to place at least part of the third portion 43 between the second portion 42 and the first end cover 2, and seal the first opening 11 with the first end cover 2.

Although this application has been described with reference to the preferred embodiments, various modifications to this application and replacements with equivalents of the components herein can be made without departing from the scope of this application. In particular, as long as there is no structural conflict, the various technical features mentioned in the embodiments can be combined in any manners. This application is not limited to the specific embodiments disclosed in this specification, but includes all technical solutions falling within the scope of the claims.

The invention claimed is:

1. A battery cell, comprising:
a housing, provided with a first opening at one end along a first direction;
a first end cover, configured to seal the first opening, wherein the first end cover comprises an end cover body and a first electrode terminal provided on the end cover body;
an electrode assembly, provided inside the housing, wherein the electrode assembly comprises a main body and a first tab led out from the main body; and
a first adapter, comprising a first portion, a second portion, and a third portion, wherein the first portion is located on a side, from which the first tab is led out, of the main body and is electrically connected to the first tab, the second portion is on a side of the main body close to the first end cover and is connected to the first portion, a first end of the third portion along a second direction is connected to a side end of the second portion along the second direction, and at least part of the third portion is located between the second portion and the end cover body and is electrically connected to the first electrode terminal, wherein the second direction is perpendicular to the first direction; and
the first tab is led out from a side end of the main body along a third direction, and the third direction is perpendicular to the first direction and the second direction.

2. The battery cell according to claim 1, wherein the second direction is consistent with a thickness direction of the electrode assembly.

3. The battery cell according to claim 2, wherein the electrode assembly further comprises a second tab led out from the main body, and the first tab and the second tab have opposite polarities and are led out from the same side end of the main body.

4. The battery cell according to claim 1, wherein a second end of the third portion along the second direction is a free end, and the third portion is configured to bend, along with the first end cover connected to the third portion, toward the second portion, so that the first end cover seals the first opening.

5. The battery cell according to claim 4, wherein the first portion, the second portion, and the third portion are all plate-shaped structures, the first portion and the second portion are provided perpendicularly, and the second portion and the third portion are provided in parallel.

6. The battery cell according to claim 1, wherein a position, connected to the third portion, of the second portion is retracted by a preset distance relative to an outer edge of the second portion along the second direction.

7. The battery cell according to claim 1, wherein a weak zone is provided at a joint between the third portion and the second portion.

8. The battery cell according to claim 7, wherein the weak zone comprises at least one of a thickness-reduced portion and a through groove extending along the third direction, and the third direction is perpendicular to the first direction and the second direction.

9. The battery cell according to claim 1, wherein the first adapter is formed by stacking a plurality of layer structures.

10. The battery cell according to claim 1, wherein a second opening is provided at another end of the housing along the first direction, the electrode assembly further comprises a second tab led out from the main body, and the battery cell further comprises:
a second end cover, configured to seal the second opening, wherein the second end cover comprises an end cover body and a second electrode terminal provided on the end cover body; and
a second adapter, comprising a first portion and a second portion, wherein the first portion is located on a side, from which the second tab is led out, of the main body and is electrically connected to the second tab, the second portion is on a side, close to the second end cover, of the main body and is connected to the first portion, and the second portion is electrically connected to the second electrode terminal.

11. A battery, comprising the battery cell according to claim 1.

12. An electric apparatus, comprising the battery according to claim 11, wherein the battery is configured to supply electric energy to the electric apparatus.

13. A manufacturing method for battery cell, comprising:
providing to-be-assembled parts comprising: a housing, an electrode assembly, a first end cover, and a first adapter, wherein a first opening is provided at an end of the housing along a first direction, the first end cover comprises an end cover body and a first electrode terminal provided on the end cover body, the electrode assembly comprises a main body and a first tab led out from the main body, the first adapter comprises a first portion, a second portion, and a third portion, the second portion is connected to the first portion, a first end of the third portion along a second direction is connected to a side end of the second portion along the second direction, the second direction is perpendicular to the first direction, and the first tab is led out from a side end of the main body along a third direction, and the third direction is perpendicular to the first direction and the second direction;
placing the first adapter in a way that the first portion is located on a side, from which the first tab is led out, of the main body and the second portion is located on a side of the main body close to the first end cover, and electrically connecting the first portion of the first adapter to the first tab;
placing the electrode assembly into the housing;
electrically connecting the third portion of the first adapter to the first electrode terminal; and
placing at least part of the third portion between the second portion and the first end cover, and sealing the first opening with the first end cover.

14. The manufacturing method according to claim 13, wherein when the first electrode terminal is electrically connected to the third portion, there is a preset included angle between the third portion and the second portion; and
the placing at least part of the third portion between the second portion and the first end cover, and sealing the first opening with the first end cover comprises:

bending, toward the second portion, the third portion along with the first end cover connected to the third portion until the first end cover seals the first opening.

* * * * *